(12) United States Patent
Kragh et al.

(10) Patent No.: US 9,134,445 B2
(45) Date of Patent: Sep. 15, 2015

(54) PROCESSING SEISMIC DATA

(75) Inventors: Julian Edward Kragh, Finchingfield (GB); Anthony Curtis, Tunbridge Wells (GB); Gabriele Busanello, Maharashtra (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 1032 days.

(21) Appl. No.: 13/201,978

(22) PCT Filed: Jan. 18, 2010

(86) PCT No.: PCT/IB2010/000073
§ 371 (c)(1),
(2), (4) Date: Dec. 14, 2011

(87) PCT Pub. No.: WO2010/082126
PCT Pub. Date: Jul. 22, 2010

(65) Prior Publication Data
US 2012/0075950 A1 Mar. 29, 2012

Related U.S. Application Data

(60) Provisional application No. 61/145,241, filed on Jan. 16, 2009.

(51) Int. Cl.
*G01V 1/36* (2006.01)
*G01V 1/38* (2006.01)

(52) U.S. Cl.
CPC .. *G01V 1/36* (2013.01); *G01V 1/38* (2013.01); *G01V 2210/56* (2013.01)

(58) Field of Classification Search
CPC ........ G01V 1/36; G01V 1/38; G01V 2210/56
USPC ....................................... 367/21, 24
See application file for complete search history.

(56) References Cited

U.S. PATENT DOCUMENTS 2,757,356 A * 7/1956 Haggerty ................. 367/24
3,952,281 A * 4/1976 Parrack .................... 367/20
(Continued)

FOREIGN PATENT DOCUMENTS

| GB | 2233455 | 1/1991 |
| GB | 2384559 | 2/2005 |

(Continued)

OTHER PUBLICATIONS

Goto et al., "Source and receiver measurements and corrections for the effects of sea surface wave heights," SEG Las Vegas Annual Meeting, 2008: pp. 60-64.
(Continued)

*Primary Examiner* — Ian J Lobo

(57) ABSTRACT

Embodiments of the invention provide a method of processing marine seismic data, the data having been acquired using a "dense over/sparse under" streamer array having N over streamers disposed at a first depth and M under streamers disposed at a second depth greater than the first depth, where 0<M<N. The method comprises: a) processing seismic data for one of the over streamer target locations and seismic data for one of the under streamer target locations; b) processing seismic data for another of the over streamer target locations; and c) combining the result of (a) and the result of (b). The one of the over streamer target locations and the one of the under streamer target locations may lie in a vertical plane.

12 Claims, 9 Drawing Sheets

(56) References Cited

U.S. PATENT DOCUMENTS

| | | | |
|---|---|---|---|
| 4,353,121 A | 10/1982 | Ray et al. | |
| 4,547,869 A | 10/1985 | Savit | |
| 4,888,742 A | 12/1989 | Beasley | |
| 4,992,991 A | 2/1991 | Young et al. | |
| 4,992,992 A | 2/1991 | Dragoset, Jr. | |
| 5,148,406 A | 9/1992 | Brink et al. | |
| 5,361,381 A | 11/1994 | Short | |
| 6,493,636 B1 | 12/2002 | DeKok | |
| 6,903,998 B2 * | 6/2005 | Vaage | 367/24 |
| 7,328,108 B2 | 2/2008 | Robertsson et al. | |
| 7,386,397 B2 | 6/2008 | Amundsen et al. | |
| 7,391,673 B2 | 6/2008 | Regone et al. | |
| 7,835,224 B2 | 11/2010 | Robertsson et al. | |
| 8,553,491 B2 * | 10/2013 | Gratacos | 367/24 |
| 2007/0121964 A1 | 5/2007 | Rumreich | |
| 2008/0025147 A1 * | 1/2008 | Ferber | 367/24 |
| 2010/0074049 A1 | 3/2010 | Kragh et al. | |

FOREIGN PATENT DOCUMENTS

| | | |
|---|---|---|
| GB | 2424952 | 10/2006 |
| GB | 2446825 | 8/2008 |
| WO | 03100461 | 12/2003 |
| WO | 2005019868 | 3/2005 |
| WO | 2005114258 | 12/2005 |
| WO | 2007006785 | 1/2007 |
| WO | 2008005798 | 1/2008 |
| WO | 2008102134 | 8/2008 |

OTHER PUBLICATIONS

Hill et al., "Over/under acquisition and data processing: the next quantum leap in seismic technology?" First Break, Jun. 2006, vol. 24: pp. 81-95.

Hill et al., "Imaging beneath basalt using an over/under towed-streamer configuration," World Oil, May 2006: pp. 55-61.

Long et al., "A calibrated dual-sensor streamer investigation of deep target signal resolution and penetration on the NW Shelf of Australia," SEG Las Vegas Annual Meeting, 2008: pp. 428-432.

Moldoveanu et al., "Over/under towed-streamer acquisition: A method to extend seismic bandwidth to both higher and lower frequencies," The Leading Edge, Jan. 2007: pp. 41-58.

Ozdemir et al., "Robust deghosting of over/under data using noise statistics," PETEX (Petroleum Experts) Conference, Nov. 2008: pp. 1-5.

Posthumus, "Deghosting using a twin streamer configuration," Geophysical Prospecting, 1993, vol. 41: pp. 267-286.

Robertsson et al., "Rough-sea deghosting using a single streamer and a pressure gradient approximation," Geophysics, Nov.-Dec. 2002, vol. 67(6): pp. 2005-2011.

Combined Search and Examination Report of British Application No. GB 0703619.7 dated May 3, 2007: pp. 1-8.

International Search Report and Written Opinion of PCT Application No. PCT/GB2008/000587 dated Sep. 7, 2009: pp. 1-17.

International Search Report and Written Opinion of PCT Application No. PCT/IB2010/000073 dated Sep. 8, 2010: pp. 1-11.

* cited by examiner

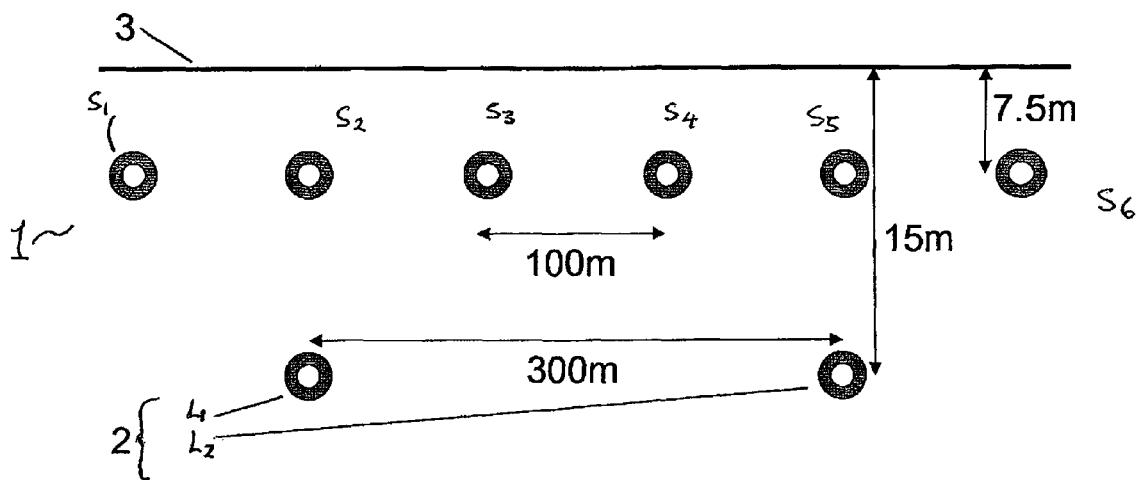
Figure 1
A 3D dense-over/sparse-under towing configuration. The marked distances are examples only.
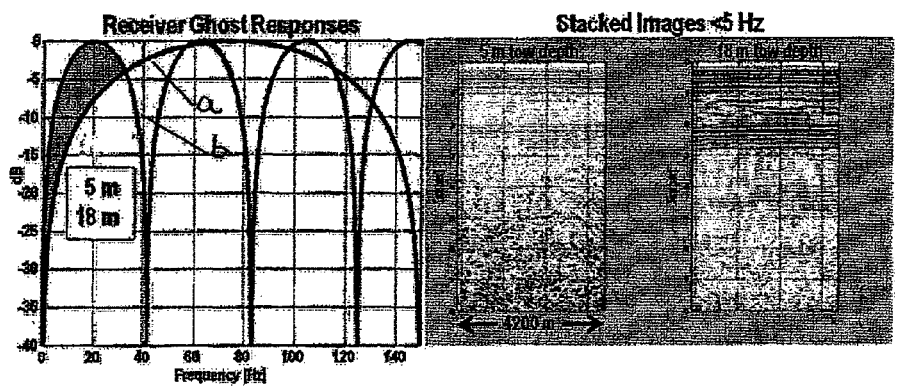
Figure 2(a) (left): Example of shallow and deep tow ghost responses. The ghost responses show the improved signal from the deeper cable below about 30 Hz (shaded).
Figure 2(b) (right): Stacked images obtained from receivers at the depths indicated in figure 2(a).

Acquire over/sparse under data    Retrieve over/sparse under data    2

Select over cable(s) paired with sparse under cable(s)    3

Combine over and under data    4

Select over cable(s) not paired with sparse under cable(s)    5

Process over cable data    6

Combine over data with combined over and under data    7

Further processing    8

Fig 3

Acquire over/sparse under data     Retrieve over/sparse under data     2

Select over cable(s) paired with sparse under cable(s)     3

Process over and under data     4

Combine over data with processed over and under data     5

Optional spectral balancing     5A

Process combined data     6

Further processing     7

Fig 5

PROCESSING SEISMIC DATA

FIELD

This applications relates in general to seismic data acquisition and processing and, more specifically, but not by way of limitation, to a method of processing dense-over/sparse-under marine seismic data.

BACKGROUND

One common type of seismic survey is a "towed marine" seismic survey, in which a "spread" of one or more streamer cables (or just "streamers") having seismic receivers disposed along their length are towed through water by a survey vessel. A source array is also towed through the water, either by the survey vessel or by a separate source tow vessel.

Various factors influence the depth at which the streamer is towed. A streamer towed at a shallow depth is more susceptible to environmental noise, so that the signal-to-noise ratio in acquired data is higher for data acquired at a deeper streamer. However, the deeper is the streamer, the greater is the attenuation at high frequencies.

One feature that influences the choice of streamer depth is the phenomenon known as the "ghost" effect. As is known, the "ghost effect" at a receiver disposed in a water column occurs as a result of interference between a seismic signal arriving at the receiver directly from reflection at a geological feature within the earth and a seismic signal from that geological feature that has travelled to the surface of the water column and has been reflected at the surface of the water column back to the receiver. The ghost effect causes variations in the amplitude of a recorded seismic signal, and causes ghost "notches" at which the recorded amplitude become zero at specific frequencies at which there is a destructive interference of the wavefields travelling in opposite directions at the receiver.

As reflection at the sea surface is negative (ie, there is a phase change of $\pi$ upon reflection at the sea surface), for the case of normal incidence, i.e., vertically travelling waves that will be travelling at normal incidence to the sea surface, the ghost notch frequency is given by:

$$f_{notch} = nc/2h \qquad (1)$$

where n is an integer such that n≤0, h is the streamer depth and c is the velocity of sound in the water column (c is sometimes referred to as the "water velocity", but it should be noted that it does not denote the speed of movement of water in the water column).

FIG. 2(a) shows the amplitude plotted against frequency for receivers at two depths. A shallow streamer has the first-order (n=1) ghost notch at a high frequency, but there is considerable attenuation at low frequency owing to the zero-order ghost notch at 0 Hz (see the line "a" in FIG. 2(a)). As a result the shallow streamer has a poor signal-to-noise ratio in the low frequency part of the spectrum, and this can present problems as low frequency information is often of interest in seismic surveys. On the other hand a deep streamer has a strong low frequency response (there is less attenuation at low frequencies), but the first-order (n=1) ghost notch occurs at a relatively low frequency (see the line "b" in FIG. 2(a)). This also presents problems in seismic surveying, as the seismic bandwidth in a typical survey (that is, the frequency range of interest) extends up to 100 Hz and above.

In summary, the ghost effect influences the tow depth used for the streamer spread-towing a streamer at a shallow depth provides for good higher frequency acquisition (i.e., good signal-to-noise ratio at the higher frequencies), but at the expense of attenuation at lower frequencies, whereas towing the streamer at a deeper depth provides for better acquisition at lower frequencies (i.e., good signal-to-noise ratio at the lower frequencies) at the expense of attenuation of other frequencies within the seismic bandwidth.

It should be noted that the above description relates to ghost effects at the receiver, ie to receiver-side ghost effects. Ghost effects may also occur at the source, leading to "source ghost notches"—that is, to notches in the spectrum of energy emitted by the source.

Compensating for ghost effects has been the subject of geophysical research for many years.

One solution for compensating for the receiver-side ghost effect is referred to as over/under acquisition. In over/under acquisition, streamers are towed as vertically aligned pairs and seismic data acquired at the two streamers of a pair are combined to achieve the deghosting step (see for example, B. J. Posthumus, *Deghosting Using a Twin Streamer Configuration*, Geophysical Prospecting, 41, 267-286, 1993, the content of which is hereby incorporated by reference.) Another solution uses streamers at only one depth, with the streamers having receivers that record both pressure and particle velocity measurements. The pressure and velocity measurements from the streamers are combined to achieve a deghosting step (see for example, Andrew Long, Dave Mellors, Terry Allen, and Avon Mc Intyre, *A Calibrated Dual-Sensor Streamer Investigation Of Deep Target Signal Resolution And Penetration On The NW Shelf Of Australia* (CH 2.7) 78th SEG 2008, the content of which is hereby incorporated by reference).

Because of the streamer arrangement, the over/under method of receiver-side de-ghosting requires twice as many streamers to cover the same spread aperture as a traditional streamer system, with a corresponding decrease in acquisition efficiency. Moreover, a tow vessel is generally limited in the number of streamers that it can tow, so that towing streamers in an under/over arrangement requires either an increased streamer spacing or a reduced spread width compared to a single depth streamer array. The pressure plus velocity method of Long et al. (above) requires new hardware, and suffers from high levels of noise in velocity measurements at low frequencies, rendering such measurements un-useable below a cut-off frequency (so that, below this frequency, the method reduces to a deep tow pressure measurement).

A proposed new solution for the ghost effect is described in WO2008102134 (the entire content of which is hereby incorporated by reference for all purposes). WO2008102134 describes a method that is referred to as the "sparse under method". In the sparse under method of WO2008102134, shallow towed streamers are used in combination with a smaller number of deeper towed streamers. This is in contrast to traditional over/under acquisition as described above, in which both over- and under-streamers are towed at greater depths than the shallow depth streamers of the sparse under method and the streamers are towed in pairs.

The method of WO2008102134 is illustrated schematically in FIG. 1. This is a vertical cross-section through a seismic survey, perpendicular to the streamer direction (that is, the streamers extend into the plane of the paper in FIG. 1). A plurality of "over streamers" 1 (also denoted as $S_1 \ldots S_6$) are towed at a shallow depth, in the example of FIG. 1 at a depth of 7.5 m below the surface 3 of the water column. A plurality of "under streamers" 2 (also denoted as $L_1$ and $L_2$) are towed at a deeper depth, in the example of FIG. 1 at a depth of 15 m below the surface 3 of the water column. There are fewer under streamers 2 than over streamer 1. As a result, some of the over streamers 1 can be considered as being "paired" with a respective under streamer—in the example of FIG. 1, the over streamers $S_2$ and $S_5$ can be considered as being "paired" with under streamers $L_1$ and $L_2$ respectively. The other over streamers $S_1$, $S_3$, $S_4$ and $S_6$ can be considered as "unpaired", as they are not paired with any of the under streamers. The over streamer and the under streamer forming a "pair" are preferably disposed in a common vertical plane (to within the usual tolerance within which streamers can be deployed in an actual marine survey).

The key difference between the method of WO2008102134 and the conventional method is that, in the sparse under method, the use of a shallower tow depth for the upper streamers provides for optimization of the mid- and upper-frequencies in the acquired seismic survey. In the sparse under method, a smaller number of deeper cables are positioned at a depth that optimizes the low frequencies only. Combining the two datasets, for example by merging low frequency data from the deep towed cables 2 with high frequency data from the shallow towed cables 1 provides broadband data with good signal-to-noise ratio at both the high and low ends of the spectrum, while requiring fewer streamers than in a conventional under/over survey.

The effect of the method of WO2008102134 is illustrated with reference to FIG. 2(b). The left panel of FIG. 2(b) shows typical stacked seismic data acquired at a streamer towed at a depth of 5 m below the surface of a water column (an "over" streamer), and the right panel of FIG. 2(b) shows typical stacked seismic data acquired at a streamer towed at a depth of 18 m below the surface of a water column (an "under" streamer). FIG. 2(b) shows stacked data for frequencies below 5 Hz and it can be seen that, even at these very low frequencies, there is a very good useable signal-to-noise ratio from the streamer towed at a depth of 18 m. In contrast, the data acquired by the streamer at a depth of 5 m is of low quality at frequencies below 5 Hz, and this is because the prominent ghost notch at leads to a very poor signal-to-noise ratio at low frequencies. In the method of WO2008102134, the low frequency data acquired by the under streamer is combined with the high frequency data acquired by the over streamer. (It should be noted that the precise "cross-over frequency", above which data from the over streamer are used and below which data from the under streamer are used, will depend on the actual signal-to-noise ratio for real data, and so cannot be accurately established from the ghost responses alone.)

With regard to the zero frequency notch, the zero frequency notch is present in all of the described solutions for compensating for the ghost effect, but all solutions provide for enhanced low frequency content/acquisition compared to standard shallow towed streamer spreads.

SUMMARY

A first aspect of the invention provides a method of processing marine seismic data, the data having been acquired at N over streamers disposed at a first depth and at M under streamers disposed at a second depth greater than the first depth, where 0<M<N, the method comprising:

processing seismic data for a first over streamer target location and seismic data for a first under streamer target location; processing seismic data for a second over streamer target location; and combining the results.

A "target location" of an over streamer (or an "over streamer target location") is the location at which that over streamer is intended to be deployed during data acquisition. As used herein, the "target location" of an over streamer refers to its relative position in the streamer array, for example its intended distance from the centreline of the array. When a survey is carried out the actual positions of one or more of the over streamers may however be displaced from the respective target location(s) owing to the action of wind, currents or tide. If a particular over streamer is deployed actually at its target location during a survey, seismic data acquired by that over streamer constitute seismic data for that over streamer target location. However, if one or more over streamers are caused to be displaced from their respective target location(s) while the survey is being performed, there may be one or more over streamer target locations at which no streamer was present during the survey—so that no data is acquired at that over streamer target location(s). In this case, seismic data may be simulated for an over streamer target location for which no data were acquired, from seismic data acquired at the actual over streamer positions. This may for example be done using any suitable interpolation/extrapolation techniques.

As used herein, an "under streamer target location" is a location directly below an over streamer target location, and at the under streamer depth. Thus, an over/spare under array having N over streamers and M under streamers will have N over streamer target locations and will have N under streamer target locations, with each under streamer target location being directly below a respective over streamer target location.

Seismic data for an under streamer target location may again be seismic data that were acquired by an under streamer deployed at the target location, or may be seismic data that were simulated for the under streamer target location from data acquired at other locations, for example by applying any suitable interpolation/extrapolation technique to data acquired at under streamers of the array. It should be noted that, even if the under streamers are deployed at their intended location there must be at least (N–M) under streamer target locations at which an under streamer is not present and data for these (N–M) under streamer target locations can only be obtained by simulation.

For example FIG. 1 shows an array in which N=6 and M=2. This has N (=6) over streamer target locations, and N (=6) under streamer target locations, with each under streamer target location being directly below an over streamer target location. The under streamer $L_1$ is positioned at the under streamer target location directly below the second over streamer $S_2$ and the under streamer $L_2$ is positioned at the under streamer target location directly below the fifth over streamer $S_5$. There are no under streamers at the under streamer target locations directly below the first, third, fourth and sixth over streamer $S_1$, $S_3$, $S_4$, $S_6$, so that data for these under streamer target locations must be simulated from data acquired by streamers at other locations. (It should be noted that FIG. 1 shows the over streamers 1 and under streamers 2 deployed at their respective target locations. If, for example, the under streamers were significantly displaced from their intended position by the action of wind, tide or currents (ie were displaced by more than the usual tolerance of streamer deployment), it could be that data would not be acquired at any one of the under streamer target locations so that it would be necessary to simulate data for all the under streamer target locations. Similarly, if one or more of the over streamers were significantly displaced from their target location it would be necessary to simulate data for the corresponding over streamer target location(s).)

Preferably, the first under streamer target location is vertically below the first over streamer target location, as this will provide the best results. However a method of the invention may still provide good results if the first under streamer target location is not vertically below the first over streamer target location, and the first under streamer target location and the first over streamer target location may be laterally offset from one another by up to a few metres (which is a typical tolerance in streamer deployment). The data obtained by processing the seismic data for the first over streamer target location and seismic data for the first under streamer target location may be expected to have a low signal-to-noise ratio at low frequencies. This data may therefore used to supplement, or replace, the low frequency data for the second over streamer target location. (It should be noted that in embodiments of the invention, for example as described with reference to FIG. 10, the first over streamer target location and the second over streamer target location may be the same target location.)

A second aspect of the invention provides a method of processing marine seismic data, the data having been acquired at N over streamers disposed at a first depth and at M under streamers disposed at a second depth greater than the first depth, where 0<M≤N, the method comprising:
applying a first processing method to seismic data for a first over streamer target location and seismic data for a first under streamer target location; combining the result with seismic data for a second over streamer target location; and applying a second processing method to the result of the combination.

Preferably, the first under streamer target location is vertically below the first over streamer target location.

The seismic data for the over streamer target locations and the under streamer target locations may be acquired by respective streamers disposed at the over streamer target locations and the under streamer target locations. This is the case if streamers are deployed at the target locations within the streamer array during acquisition of the data.

Alternatively the seismic data for at least one of the over streamer and/or under streamer target locations may be simulated seismic data. This applies if no streamer was present at a particular target location when data were acquired, so that no data were acquired at that target location—for example if one or more streamers were displaced from their intended target location or if no streamer was deployed at one or more under streamer target locations. In this case, data for a target location at which no streamer was deployed may be simulated from the seismic acquired by the streamers.

A method of the invention may be a computer-implemented method.

Another aspect of the invention provides a corresponding computer-readable medium.

Another aspect of the invention provides an apparatus for processing seismic data, the data having been acquired at N over streamers disposed at a first depth and at M under streamers disposed at a second depth greater than the first depth, where 0<M≤N, the apparatus comprising: a processor for processing seismic data for a first streamer target location and seismic data for a first under streamer target location; a processor for processing seismic data for a second over streamer target location; and a combiner for combining the outputs of the processors.

Another aspect of the invention provides an apparatus for processing marine seismic data, the data having been acquired at N over streamers disposed at a first depth and at M under streamers disposed at a second depth greater than the first depth, where 0<M≤N, the apparatus comprising: a processor for processing seismic data for a first over streamer target location and seismic data for a first under streamer target location; a combiner for combining the output of the processor with seismic data for a second over streamer target location; and a processor for processing the output of the combiner.

In an apparatus of the invention, the processors and the combiner may be separate functional components, or may be separate logical components. Alternatively they may be embodied as a single component (such as, for example the processor 5 of FIG. 7).

Embodiments of the present invention provide methods for processing dense-over/sparse-under acquired data. More specifically, but not by way of limitation, an embodiment of the present invention provides for using 3D acquisition geometries to process dense over/sparse under data.

As explained above, "dense-over/sparse-under" acquisition is a recent marine acquisition method that is described in WO 2008/102134, the entire disclosure of which is incorporated herein by reference for all purposes. In WO 2008/102134, one of the aspects of the invention is that an optimal signal-to-noise ratio of the dense over/sparse under system is obtained by merging only low frequencies from deep towed cables with only high frequencies from shallow towed cables. This provides that fewer deeper streamers are required for data acquisition as the deeper streamers are only used for low frequency acquisition. In summary, the dense over/spare under method combines the enhanced low frequency spectrum of conventional over/under acquisition with the high frequency benefits of conventional shallow-towed marine acquisition. Additionally, the dense over/sparse under method is more efficient than the over under method since it uses fewer streamers, i.e., less fewer streamers. The present invention provides improved processing methods that may be applied to data acquired using dense-over/sparse-under acquisition.

BRIEF DESCRIPTION OF THE DRAWINGS

Embodiments of the present invention will now be described by way of illustrative example with reference to the accompanying drawings in which:

FIG. 1 is a schematic section view of a dense-over/sparse-under marine seismic survey;

FIG. 2(a) illustrates shallow and deep ghost responses;

FIG. 2(b) illustrates data acquired at receivers at the two depths of FIG. 2(a);

FIG. 3 is a schematic block flow diagram of a method of the invention;

FIG. 5 is a schematic block flow diagram of another method of the invention;

DETAILED DESCRIPTION

Figure 4:
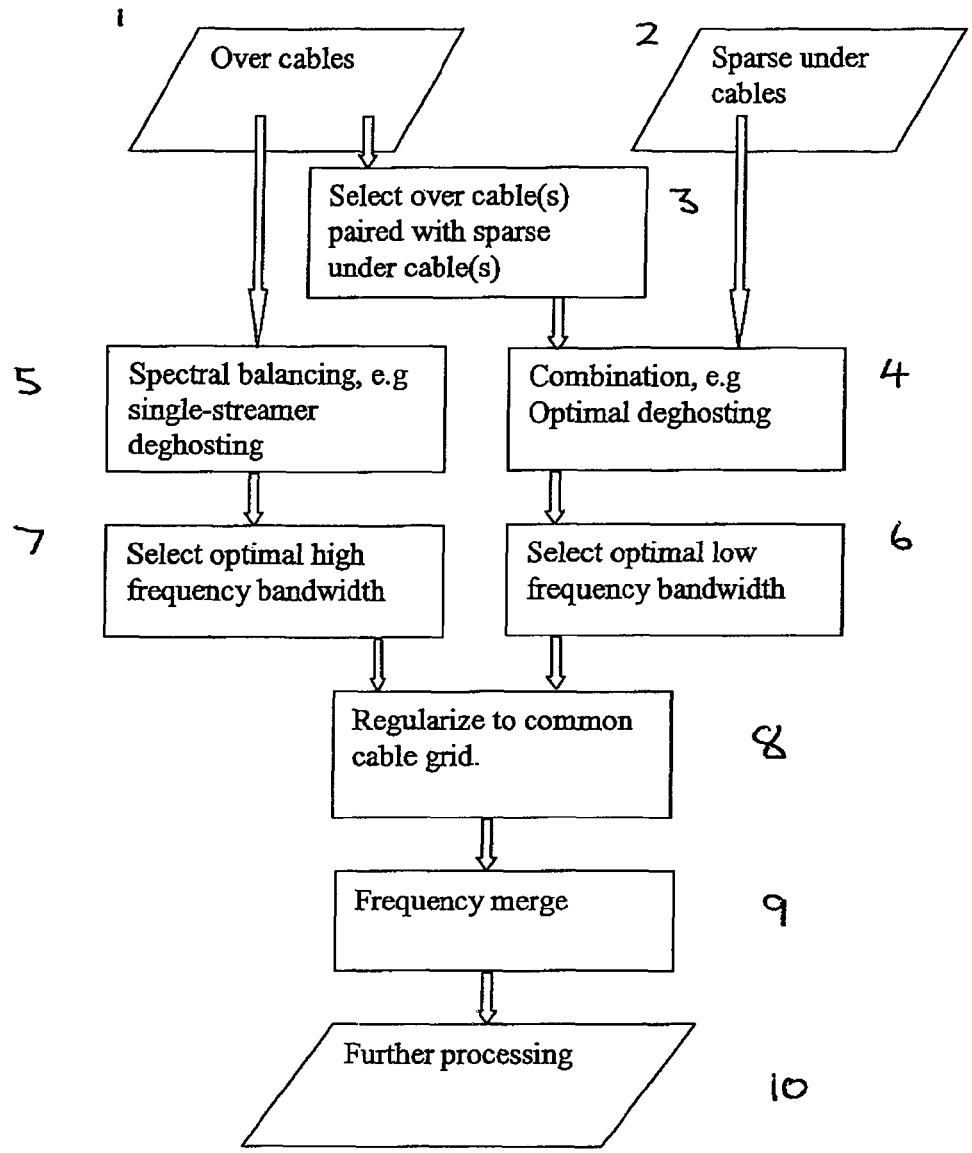
FIG. 4 is a schematic block flow diagram of another method of the invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 3 is a schematic block flow diagram of a method of the invention.

Initially in the method of FIG. 3 seismic data are acquired at step 1. The seismic data are acquired using a "dense-over/sparse-under" marine seismic survey of the type shown generally in FIG. 1, having N over streamers 1 disposed at a first depth below the water surface 3 and M under streamers 2 disposed at a second depth below the water surface 3, with the second depth greater than the first depth, and with 0<M<N (that is, there must be at least one under streamer 2, and the number of under streamers is less than the number of over streamers). Alternatively, the method be carried out using pre-existing data that were acquired using a "dense-over/sparse-under" marine seismic survey and, in this case, step 1 of acquiring the data is replaced by step 2 of retrieving dense-over/sparse-under marine seismic data from storage. (The method of FIG. 3 is described on the assumption that the streamers are deployed at their target locations during data acquisition, for example as shown in FIG. 1; there is a description below as how the method may be applied if one or more streamers are displaced from their respective target location(s) during acquisition of the seismic data.)

At step 3, at least one over cable 1 that is "paired" with an under cable 2 is selected. Preferably, this selects at least one over cable that is substantially vertically aligned—within the usual tolerances involved in towed streamer surveys—with an under cable. When, applied to the "dense-over/sparse-under" marine seismic survey of FIG. 1, step 3 could select one or two over cables, as the left-but-one and right-but-one over cables ($S_2$, $S_5$) of FIG. 1 are each paired with an under cable.

At step 4, seismic data acquired at an over cable (and so were acquired at an over cable target location, since all streamers are assumed to be at their respective target locations) that was selected in step 3 are combined with seismic data acquired at the under cable with which that over cable is paired (and so are combined with data acquired at an under cable target location). In general, the combination is effected so as to reduce noise in the data. In one embodiment of the present invention, a deghosting technique may be used to combine the data acquired by the over/under cable pairs, for example one of the under/over deghosting techniques mentioned above. In such an embodiment, simultaneous deghosting and noise attenuation is provided. In certain aspects, the process may include maximizing the signal-to-noise ratio using the estimated deghosted wavefield (for example using the method described by A. K. Özdemir et al, *Robust Deghosting Of Over/Under Data Using Noise Statistics* PESGB, PETEX 2008, "On how to combine over/under data and taking in to account the signal-to-noise ratio in the combination to optimize the output signal-to-noise ratio") (the entire disclosure of which is hereby incorporated by reference herein in its entirety for all purposes).

If more than two over cables 1 were selected at step 3, step 4 is preferably carried out for each of the selected over cables.

At step 5, one or more of the over cables 1 that were not selected in step 3 are selected. Preferably, all over cables 1 that were not selected in step 3 are selected. When applied to the "dense-over/sparse-under" marine seismic survey of FIG. 1, as an example, step 5 could select up to four over cables $S_1$, $S_3$, $S_4$, $S_6$ (ie, all over cables except for the left-but-one and right-but-one over cables).

At step 6, seismic data acquired at one or more over cables selected in step 5 are processed. These data are acquired for one or more over streamer target locations, since all streamers are assumed to be at their respective target locations. For example, seismic data acquired at the over cable(s) may be deghosted using any suitable deghosting techniques, such as, as an example, the deghosting technique of Johan O. A. Robertsson and Ed Kragh, "Rough sea deghosting using a single streamer and a pressure gradient approximation", Geophysics, Vol. 67, pp 2005-2011 (2002).

If more than two over cables 1 were selected at step 5, step 6 is preferably carried out for each of the selected over cables.

At step 7, the combined seismic data obtained in step 4 are combined with the processed data obtained in step 6. For example, as explained with reference to FIG. 2, it is expected that the data acquired by the over streamers will have a poor signal-to-noise ratio at low frequencies, and step 7 may comprise using the data obtained in step 4 below a cut-off frequency and using the data obtained in step 6 above that cut-off frequency; alternatively, step 7 may comprise using the data obtained in step 4 to supplement the data obtained in step 6 below a cut-off frequency (while using just the data obtained in step 6 above that cut-off frequency).

It should be noted that where step 4 involves obtaining deghosted data from the under and over data, the output (ie the deghosted data) may not be at the over cable depth—in general, a deghosting step will produce deghosted data for a specified depth (which, dependent on the deghosting technique used, may potentially be at any depth). Step 7 may therefore involve regularising the data obtained at step 4 and the data obtained at step 6 to a set of common output points before combining the data; this may conveniently be done by regularising the data obtained at step 4 to the output locations of the over streamers.

FIG. 4 is a block flow diagram of another method of the invention. The method of FIG. 4 is based on the method of FIG. 3.

At steps 1 and 2, of FIG. 4 seismic data are acquired at N over streamers 1 disposed at a first depth below the water surface 3 and M under streamers 2 disposed at a second depth below the water surface 3, with the second depth greater than the first depth, and with 0<M<N. Alternatively, steps 1 and 2 may comprise retrieving dense-over/sparse-under marine seismic data from storage. (The method of FIG. 4 is described on the assumption that the streamers were deployed at their target locations during data acquisition, for example as shown in FIG. 1; there is a discussion below as how the method may be applied if one or more streamers were displaced from their respective target location(s) during acquisition of the seismic data.)

At step 3, at least one over cable 1 that is paired with an under cable 2 is selected, and at step 4 seismic data acquired at an over cable that was selected in step 3 are combined with seismic data acquired at the under cable with which that over cable is paired.

Steps 1-4 correspond generally to steps 1-4 of FIG. 3, and detailed description of these steps will therefore be omitted.

At step 5, seismic data acquired at one or more over cables that are not paired with under cables are processed. These data are acquired for one or more over streamer target locations, since all streamers are assumed to be at their respective target locations. For example, seismic data acquired at the over cable(s) may be deghosted using any suitable deghosting techniques such as, as an example, the deghosting technique of Johan O. A. Robertsson and Ed Kragh, "Rough sea deghosting using a single streamer and a pressure gradient approximation", Geophysics, Vol. 67, pp 2005-2011 (2002). Step 5 is preferably carried out for all over cable that are not paired with an under cable.

At step 6, an optimal frequency range or bandwidth is selected for the combined over/under data obtained in step 4, and at step 7 an optimal frequency range or bandwidth is selected for the processed over data obtained in step 5. The two frequency ranges selected in steps 6 and 7 should together cover the entire frequency range of interest in the seismic survey (typically up to 80 or 100 Hz). The two frequency ranges selected in steps 6 and 7 may meet at a "cut-off" frequency, such that the frequency range selected in step 6 extends from the lowest frequency of interest (which may be 0 Hz or very close to 0 Hz) to the cut-off frequency and such that the frequency range selected in step 7 extends from the cut-off frequency to the highest frequency of interest. Alternatively, the frequency ranges may overlap (for example the frequency range selected in step 7 may extend from the lowest frequency of interest to the highest frequency of interest, while the frequency range selected in step 6 extends from the lowest frequency of interest to the cut-off frequency). The frequency ranges may be selected on the basis of the signal-to-noise ratio of the data.

At step 8 the data obtained at step 4 and the data obtained at step 5 are regularised to a set of common output points; this may conveniently be done by regularising the data obtained at step 4 to the output locations of the over streamers.

At step 9, the data obtained in step 4, for the frequency range selected in step 6, are combined with the processed data obtained in step 5 for the frequency range selected in step 7. Step 9 may comprise using the data obtained in step 4 below a cut-off frequency and using the data obtained in step 5 above that cut-off frequency; alternatively, step 9 may comprise using the data obtained in step 4 to supplement the data obtained in step 6 below a cut-off frequency (while using just the data obtained in step 5 above that cut-off frequency).

The data obtained at step 7 of FIG. 3 or at step 9 of FIG. 4 may be treated as any other marine seismic 3D data set, but with the advantage that the processed data set in accordance with an embodiment of the present invention has an improved signal-to-noise ratio in the low frequencies. The data may undergo further processing (denoted generally as step 8 in FIG. 3 and step 10 in FIG. 4), for example to obtain information about one or more parameters of the earth's interior, to locate and/or characterise hydrocarbon deposits etc.

FIG. 5 shows a method according to another embodiment of the invention.

Steps 1 to 4 of FIG. 5 correspond to steps 1-4 of FIG. 3, and their description will not be repeated. (The method of FIG. 5 is described on the assumption that the streamers are deployed at their desired positions during data acquisition, for example as shown in FIG. 1; there is a discussion below as how the method may be applied if one or more streamers were displaced from their respective target location(s) during acquisition of the seismic data.)

At step 5, the data obtained by combining the over cable data and the under cable data for the pair(s) of over and under cables are combined with the data acquired at the remaining over cables (ie at those over cables that are not paired with an under cable).

In one embodiment of the method of FIG. 5, step 5 comprises redatuming, to the depth level of the over cables, the data obtained by combining the over cable data and the under cable data. This may be done by any suitable redatuming method.

Optionally up/down wavefield separated data may be obtained from the paired over/under cable data, and used in verifying whether the calculated redatum is correct and, if necessary, correcting the redatuming.

Figure 6:
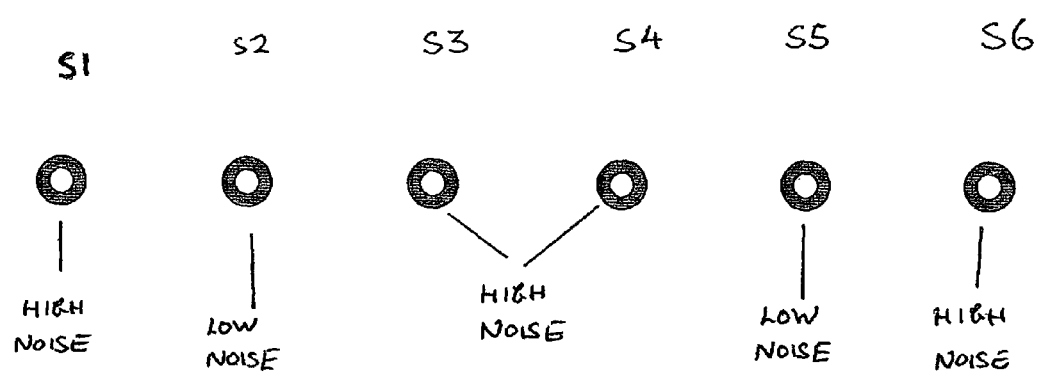
FIG. 6 is a schematic illustration of the results of one stage of FIG. 5.

The "single depth" data attained in this embodiment of the present invention after the redatuming may be considered as equivalent to a conventional 3D spread, but with the difference that the signal-to-noise ratio is no longer equal across the 3D spread. In the "single depth data" processed in accordance with this embodiment of the present invention, unlike conventional 3D data, the low frequency signal-to-noise is considerably improved where data for an over-under cable pair were acquired and processed. This is illustrated in FIG. 6, which illustrates the results obtained when the method of FIG. 5 is applied to data acquired using the dense over/sparse under survey of FIG. 1. The locations S1-S6 in FIG. 6 correspond to the positions of the shallow cable (the over cables) 1 of FIG. 1. Data are available at all locations S1-S6—but the data at locations S2 and S5 are obtained by combining data acquired by an over-cable and under-cable pair and redatuming the resultant data to the locations S2 and S5, whereas the data at locations S1, S3, S4 and S6 are the data acquired by the over streamer positioned at each of these locations. As a result the data at locations S2 and S5 are expected to have a lower signal-to-noise ratio than the data at locations S1, S3, S4 and S6.

In this embodiment, step 6 comprises processing the data for the over cable locations. As explained above the data have a variable signal-to-noise ratio, but the signal-to-noise ratio has a consistently repeated pattern (as shown in FIG. 6) which may be thought of as an additional, undesired acquisition footprint. (A "footprint" is a characteristic of acquired seismic data (in this case the pattern of the signal-to-noise ratio) that arises from the survey geometry and is not due to any geological feature within the earth. When the seismic data are processed, it is important to ensure that the effect of the footprint is removed to the greatest extent possible. In the present case, the additional footprint owing to the pattern of the signal-to-noise ratio is acceptable, as it is not damaging to the final, processed data.

In principle, the "single depth" data obtained in step 5 may be directly processed to obtain information about the earth's interior, for example about one or more geophysical characteristics of the earth's interior. However the acquisition footprint caused by the variable signal-to-noise ratio means that directly processing the "single depth" data obtained in step 5 may not give good results, and it will therefore generally be preferable to carry out further processing steps on the data obtained in step 5 before the data are processed to obtain information about the earth's interior.

In one embodiment of this method, therefore, conventional processing and imaging steps may be used to process the combined data, provided that the spectral amplitudes of each streamer are balanced. An optional spectral balancing step, step 5A is shown in FIG. 5. The acquisition footprint (that is, the varying signal-to-noise ratio of FIG. 6) only exists below a certain frequency (which is generally equal or substantially equal to the cut-off frequency mentioned in the description of the methods of FIGS. 3 and 4). A deghosting step changes the spectral shape (below this frequency), and spectral balancing is optionally performed as a first order attempt at equalising the signal strengths throughout the whole data volume. Merely by way of example, in one embodiment, the ghost response of the shallow towed streamers may be applied to the data acquired at the over/under processed pairs to perform the spectral balancing. Such a processing step does not change the signal-to-noise ratio.

Once the combination of the data at step 6 is complete, the data may be treated as, and processed as, any other marine seismic 3D data set, but with the advantage that the processed data set in accordance with an embodiment of the present invention has an improved signal-to-noise ratio in the low frequencies. Further processing of the seismic data is indicated generally at step 7, which corresponds to step 8 of FIG. 3 or step 10 of FIG. 4.

Another embodiment of the method of FIG. 5 makes use of the facts that there are more shallow streamers than deep streamers. In this embodiment, the up-going only wavefield—i.e., ghost-free wavefield—at the shallow towing depth obtained processing the data from the over cable/under cable pairs at step 4 is combined at step 5 with the up-going wavefield of the remaining single ("unpaired") streamers. The up-going wavefield of an "unpaired" streamer may be obtained using a single streamer de-ghosting technique (see, for example, Johan O. A. Robertsson and Ed Kragh, "Rough sea deghosting using a single streamer and a pressure gradient approximation", Geophysics, Vol. 67, pp 2005-2011 (2002)). Thus, in this embodiment: step 4 of FIG. 5 would comprise applying a deghosting technique to the data acquired at the over cable/under cable pairs to obtain the up-going (deghosted) component at the over cable position; the method would include a further step (not shown) of processing the data acquired at un-paired over cables to obtain the upgoing (deghosted) component at the positions of the un-paired over cables; and step 5 would comprise combining the up-going components for each over cable position.

In the above description it has been assumed that the over cable and under cable of a cable pair are disposed in a vertical plane—i.e., that the over cable and under cable of a cable pair are intended to be disposed in a vertical plane when the cables are deployed. The invention is not however limited to this, and may in principle be applied to a "sparse under/dense over" survey in which the under cable(s) is/are not intended to be deployed in a vertical plane with a respective over cable. This can be done by using interpolation/extrapolation to simulate seismic data for an under cable [over cable] location that is in a vertical plane with an over cable [under cable] location at which seismic data were acquired, or even simulating seismic data at both an under cable location and an over cable location lying in a vertical plane with the under cable location.

Moreover, even in a case where the over cable and under cable of a cable pair are intended to be disposed in a vertical plane (or as close to a vertical plane as is possible when the cables are deployed), it is possible that actions of wind, current or tides may cause the over cable of a cable pair to be laterally displaced from its target position and for the under cable of the cable pair to be laterally displaced from its target position so that over cable of the table pair is laterally displaced from the under cable of the cable pair. Where the alignment of an over cable and under cable of a cable pair significantly deviates from a vertical plane, an interpolation/extrapolation technique may again be used to correct for any lateral offset between the under cable and over cable of a cable pair (although the may not be necessary for minor misalignments). For example, interpolation/extrapolation may be applied to the data acquired at over cables to estimate data for a cable position vertically above an under cable, or may be applied to the data acquired at under cables to estimate data for a cable position vertically below the over cable of a cable pair.

Figure 8:
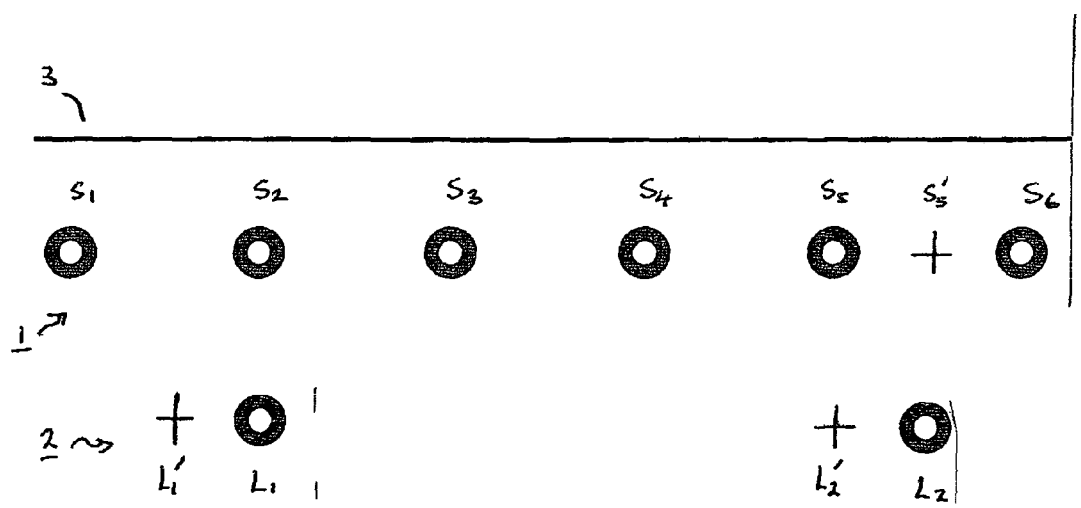
FIG. 8 is a schematic sectional view of a dense-over/sparse-under marine seismic survey illustrating displacement of one streamer from its target location.

For example, FIG. 8 is a cross-section through a spare under/over survey which corresponds generally to the survey of FIG. 1 except that the right-hand under cable $L_2$ is not in a vertical plane with any of the over cable (although the left-hand under cable $L_1$ is in a vertical plane with the over cable $S_2$). This may be intentional in the set-up of the array, or it may be because the right-hand under cable $L_2$ and/or one of the over cables has unintentionally been laterally displaced from their intended position. It is possible to apply interpolation/extrapolation to the data acquired at the under cables $L_1$, $L_2$ to simulate data for a one or more under cable target positions, with each under cable target position being at the depth of the under cables and vertically below an over cable (for example the position $L_2'$). The actual data acquired at the over cable $S_5$ (which is assumed to be at its over cable target position) and the simulated data for the under cable target position $L_2'$ may then be treated as the data for an under cable target position/over cable target position "pair", and may be used in any embodiment of the invention as described herein. Conversely, if the over streamer target location is $S_5'$ and the lower streamer $L_2$ is correctly placed at its under streamer target location, but the over streamer intended to be at the over streamer target position $S_5'$ has become displaced it would alternatively be possible to apply interpolation/extrapolation to data acquired at the over cables $S_1$ to $S_6$ to simulate data for the target position $S_5'$, which is at the depth of the over cables and that is vertically above the under cable target location at which the lower streamer $L_2$ is placed. The actual data acquired at the under cable $L_2$ and the simulated data for the over cable target position $S_5'$ may then be treated as the data acquired at an under cable target position/over cable target position "pair", and may be used in any embodiment of the invention as described herein. Moreover, it would in principle be possible to apply interpolation/extrapolation to data acquired at the over cables $S_1$ to $S_6$ to simulate data at a desired location at the depth of the over cables and also apply interpolation/extrapolation to data acquired at the under cables $L_1$, $L_2$ to simulate data at a location vertically below and at the depth of the under cables.

FIG. 8 assumes that the left-hand under cable $L_1$ is in a vertical plane with an over cable (the over cable $S_2$), with both cables being at their respective target positions. If the left-hand under cable $L_1$ is also not in a vertical plane with any of the over cables, a simulation process as described above for the right-hand under cable $L_2$ may also be applied for the left-hand under cable $L_1$.

Indeed, if any of the streamer cables become laterally displaced from their intended positions during data acquisition, for example if an over cable/under cable pair is laterally displaced from its intended position owing to the action of tides or wind, the combined data provided by the invention may be regularised to desired output locations.

Figure 9:
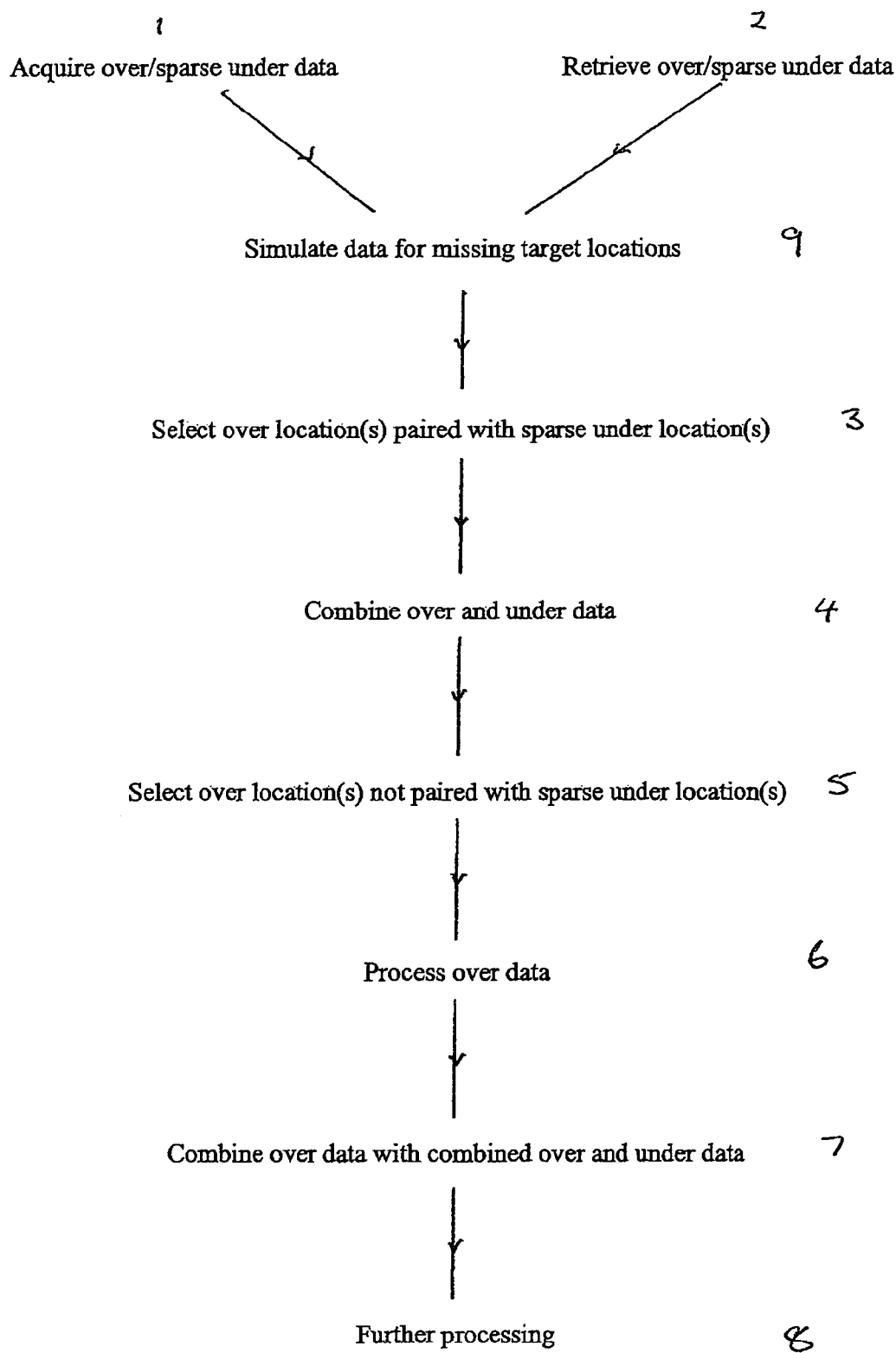
FIG. 9 is a schematic block flow diagram of another method of the invention.

Thus, in a case where one or more of the streamers were not deployed at the respective target location during data acquisition (whether because the array geometry did not provide streamers at all, or even any, of the target locations or because the streamers were unintentionally displaced from their intended positions), the method of the invention requires a further step of simulating data for the "missing" target location(s) (where a "missing" target location is a target location at which no streamer was present during data acquisition and so at which no data were acquired). This is illustrated in FIG. 9, which is a block flow diagram of another method of the invention. The method of FIG. 9 corresponds generally to the method of FIG. 3, except that where one or more of the streamers were not deployed at their respective target location during data acquisition.

At step 1 of the method of FIG. 9 seismic data are acquired at step 1. The seismic data are acquired using a "dense-over/sparse-under" marine seismic survey of the type shown generally in FIG. 1, having N over streamers 1 disposed at a first depth below the water surface 3 and M under streamers 2 disposed at a second depth below the water surface 3, with the second depth greater than the first depth, and with 0<M<N. At least one of the streamers was not deployed at its target location during data acquisition.

Alternatively, the method be carried out using pre-existing data that were acquired using a "dense-over/sparse-under" marine seismic survey and, in this case, step 1 of acquiring the data is replaced by step 2 of retrieving dense-over/sparse-under marine seismic data from storage. At least one of the streamers was not deployed at its target location during acquisition of the data that is retrieved in step 2.

At step 9, data are simulated for one or more "missing" target locations. A "missing" target location is a target location for which data is desired to be used in a processing method of the invention, but for which no data were acquired (because no streamer was present at that location). For example, with an array deployed as shown in FIG. 8, the under streamer location $L_2'$ is a "missing" target location since it is desired to combine data for the target location $L_2'$ with data acquired at over streamer $S_5$—but no data were acquired at the under streamer location $L_2'$. The data for a "missing" target location may be simulated by any suitable technique, for example an interpolation/extrapolation technique. In general, data for a "missing" over streamer target location will be simulated from the data acquired by the over streamers, and data for a "missing" under streamer target location will be simulated from the data acquired by the under streamers.

The result of step 9 is that data will be available for all target locations (or at least for all target locations that are to be involved in subsequent processing steps). Where a streamer was deployed at a target location during data acquisition, the data acquired by that streamer may be used as the seismic data for that target location. Where a streamer was not deployed at a target location during data acquisition, the seismic data for that target location will have been simulated in step 9.

Steps 3 to 8 of FIG. 9 correspond generally to steps 3 to 8 of FIG. 3 and their detailed description will not be repeated. Thus in step 3 of FIG. 9, a pair of target locations are selected—and preferably the target locations are substantially vertically aligned with one another, one at the over streamer depth and one at the under streamer depth, and data for these target locations (which may be acquired data or may be simulated data) are processed in step 4 as described for step 4 of the method of FIG. 3. In step 5 of FIG. 9 data for another target location (which may be acquired data or may be simulated data), at the over streamer depth, are selected, and at step 6 of FIG. 9 these data are processed as described for step 6 of FIG. 3, and so on.

Other methods of the invention described herein, for example the methods of FIGS. 4 and 5, may also be modified by including a step of simulating data for any "missing" target locations.

Figure 10:
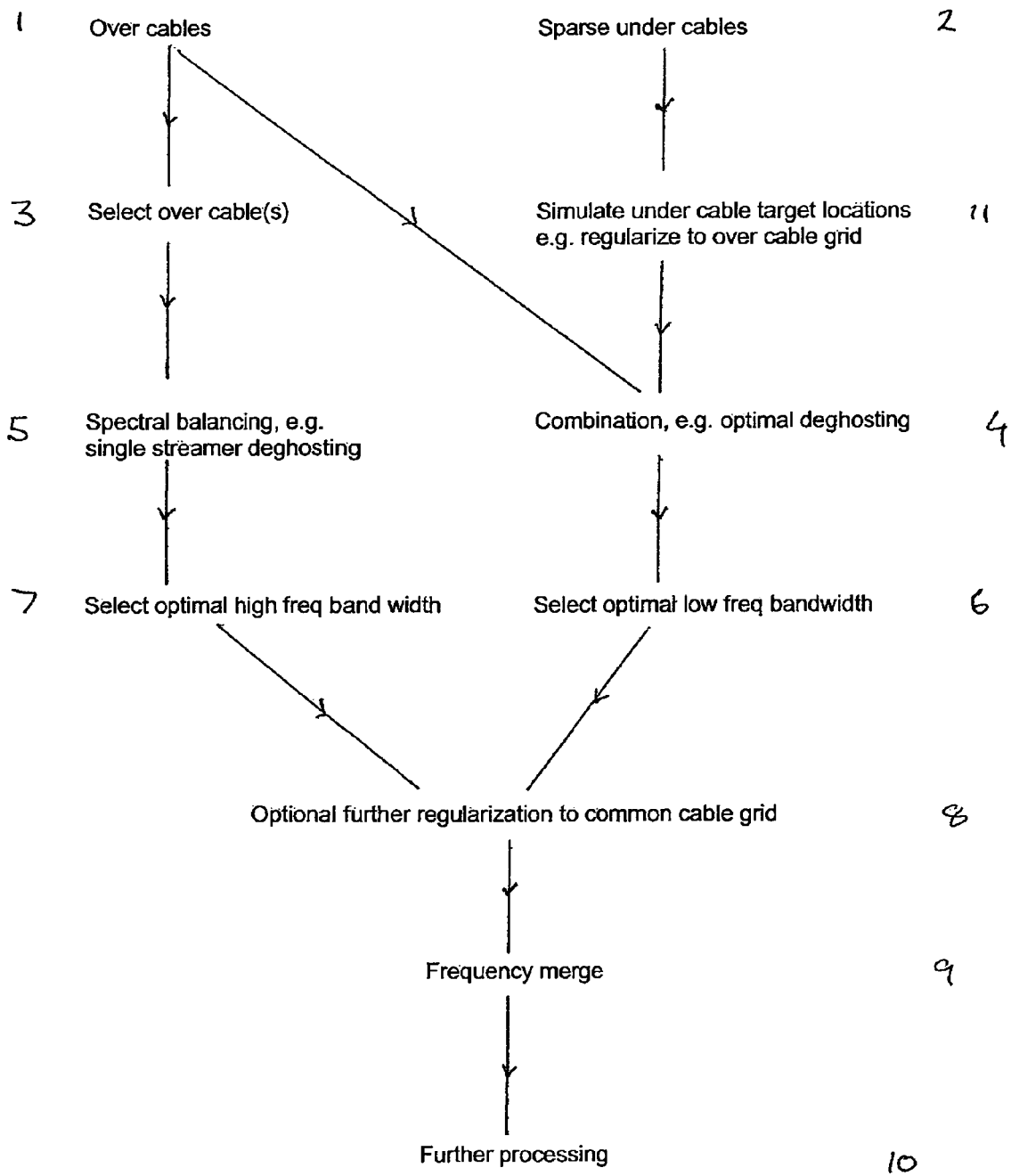
FIG. 10 is a schematic block flow diagram of another method of the invention.

In the embodiments described above, data from the over streamer and the under streamer of an over streamer/under streamer pair are combined with one another. This means that under streamer target locations at which no streamer is intended to be deployed take no part in the processing. In examples using the array shown in FIG. 1, for example, only the under streamer target locations below the second and fifth over streamers $S_2$, $S_5$ would be used in processing, as the streamers deployed at these under streamer target locations form streamer pairs with the respective over streamer. The invention is not limited to this however, as described with reference to FIG. 10 below. Moreover, in the embodiments described above, data from an over streamer/under streamer pair may be combined with data from an over streamer that is not paired with an under streamer. The invention is not limited to this, however, and data from an over streamer/under streamer pair may be combined with data from any over streamer of the array, whether or not that over streamer is paired with an under streamer. FIG. 10 is a block flow diagram showing a method according to a further embodiment of the invention illustrating this feature.

At steps 1 and 2 of FIG. 10 seismic data are acquired at N over streamers 1 disposed at a first depth below the water surface 3 and M under streamers 2 disposed at a second depth below the water surface 3, with the second depth greater than the first depth, and with 0<M<N. Alternatively, steps 1 and 2 may comprise retrieving dense-over/sparse-under marine seismic data from storage.

At step 3, one or more over streamers 1 (and possibly all over streamers of the array) are selected. Data from the selected over streamer(s) are processed at step 5, for example by applying any suitable deghosting technique or another spectral balancing technique, and at step 7 an optimal frequency range or bandwidth is selected for the processed over data obtained in step 5. Steps 5 and 7 of FIG. 10 correspond generally to steps 5 and 7 of FIG. 4, and their detailed description will not be repeated.

At step 11, data are simulated for one or more under streamer target locations, for example by applying a suitable extrapolation/interpolation technique to the data acquired at the sparse under streamers. In general each under streamer target location will be directly below a respective over streamer target location of the array, and will be at the under steamer depth. Thus, for an array as shown in FIG. 8, step 11 may comprise simulating data for one or more target locations below respective ones of the over streamers S1 to S6 (assuming that these are positioned at their respective target locations) and at the under steamer depth (for example for location $L_2'$).

In a particularly advantageous embodiment, data are simulated for respective target locations (at the under steamer depth) below every over streamer, except for target locations at which an under streamer was present (since, if an under streamer was present at a target location the data acquired by that streamer may be used and no simulation is necessary). Thus, for the array of FIG. 8, data would be simulated for target locations directly below the over streamers S1, S3, S4, S5 and S6 and at the under streamer depth. It is not necessary to simulate data for a target location below over streamer S2, as under streamer L1 is present at that target location.

In this embodiment, it is possible that step 11 will comprise simulating data for respective target locations below every over streamer. This would be the case if the under streamer L1 of FIG. 8 had actually been deployed at position $L_1'$ so that neither under streamer was directly below an over streamer—so that it would be necessary to simulate data for target locations directly below each of the over streamers S1 to S6 and at the under streamer depth.

This can be represented schematically as follows:
As deployed:

| O | O | O | O | O | O |
|---|---|---|---|---|---|
| U |   |   |   | U |   |

After simulation of under streamer data:

| O  | O  | O  | O  | O  | O  |
|----|----|----|----|----|----|
| U' | U' | U' | U' | U' | U' | where O denotes an over streamer (which is assumed to be at its respective over streamer target location), U denotes an under streamer, and U' denotes an under streamer target location (which may or may not be coincident with an under streamer).

The result of step 11 is data for one or more over cable/under cable target location pairs, where the data for the under cable target location of a pair may be simulated or may be data acquired by an under streamer at that target location. At step 4 seismic data acquired at an over cable are combined with seismic data acquired at/simulated for the under cable target location below that over cable; this may be done for one or more, and preferably for all, of the over cable/under cable target location pairs.

Step 4 corresponds generally to step 4 of FIG. 3 or FIG. 4, and its detailed description will not be repeated.

At step 6, an optimal frequency range or bandwidth is selected for the combined over/under data obtained in step 4.

At step 8 the data obtained at step 4 and the data obtained at step 5 are, if necessary, regularised to a set of common output points; this may conveniently be done by regularising the data obtained at step 4 to the output locations of the over streamers.

At step 9, the data obtained in step 4, for the frequency range selected in step 6, are combined with the processed data obtained in step 5 for the frequency range selected in step 7. The data obtained at step 9 of FIG. 10 may be treated as any other marine seismic 3D data set, but with the advantage that the processed data set in accordance with an embodiment of the present invention has an improved signal-to-noise ratio in the low frequencies. The data may undergo further processing (denoted generally as step 10 in FIG. 10), for example to obtain information about one or more parameters of the earth's interior, to locate and/or characterise hydrocarbon deposits etc.

Steps 6, 8, 9 and 10 of FIG. 10 correspond generally to steps 6, 8, 9 and 10 of FIG. 4, and their detailed description will not be repeated.

The description of the method of FIG. 10 assumes that each over streamer is at its respective over streamer target location. If this is not the case, and one or more of the over streamers had become laterally displaced from its intended location during acquisition of the data, the method of FIG. 10 could be modified by including a further step of simulating over streamer data for the target location of any over streamer that had been displaced from its target location. (In the example of FIG. 8, for example, if the over streamer S5 had been laterally displaced to position $S_5'$, it would be possible to simulate data for the target location of the over streamer S5.) Step 11 would then comprise simulating data for one or more target locations, with each under streamer target location being below a respective over streamer target location or a respective over streamer.

Where a regularisation technique is applied to processed data, the regularization of processed data from the streamer pair may use weights that are related to the signal-to-noise ratio in the data—such a technique allows handling the improved signal-to-noise ratio from the over/under pairs provided by embodiments of the present invention and spreading it at the regularized output shallow locations. In the interpolation, a trace header value can be used to define the noise on each trace independently. The method takes this parameter into account in interpolation, essentially by trying to use the less noisy traces rather than the more noisy ones. In such processing techniques, the contribution of each sample will be driven by the assigned noise value (for example the value of noise variance).

Figure 7:
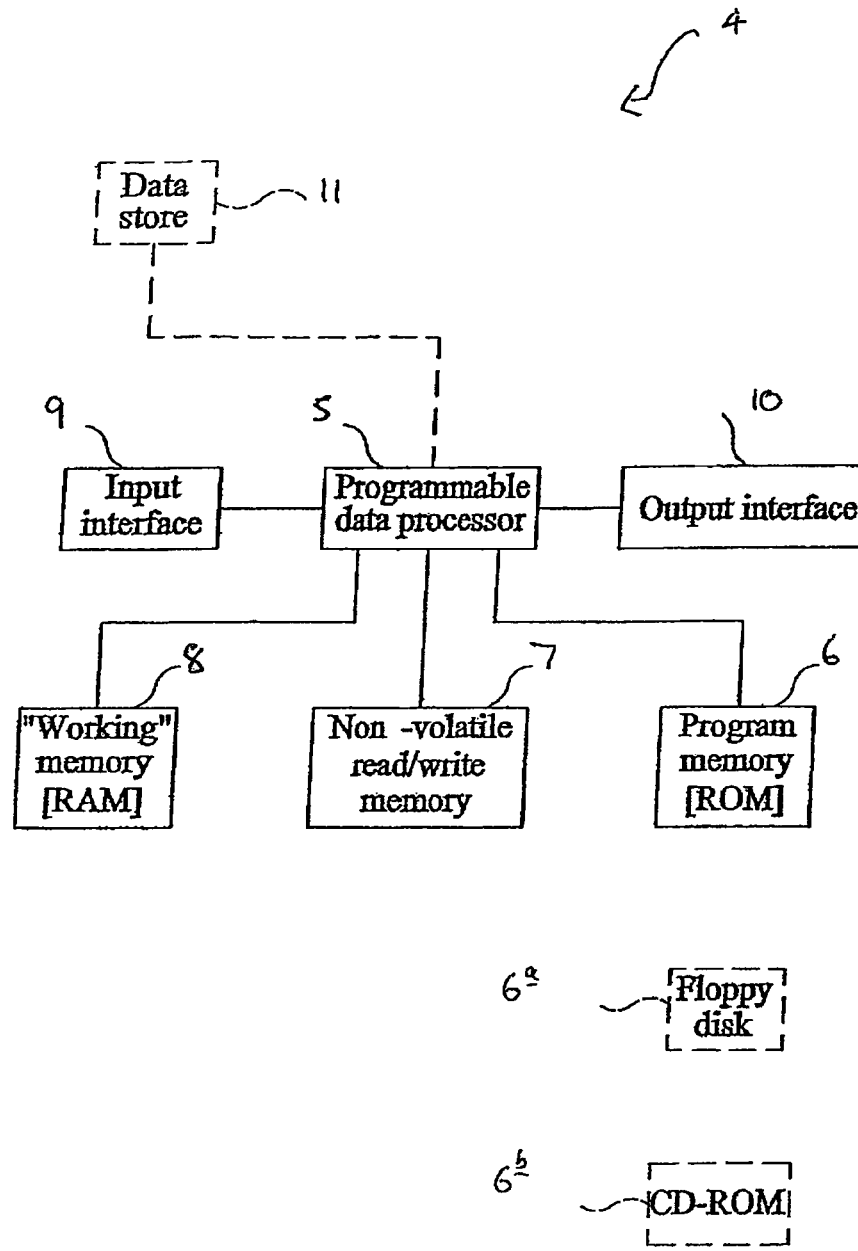
FIG. 7 is a schematic block diagram of an apparatus the invention.

Both the processing techniques described above, which may be used in the method of embodiments of the present invention—i.e., deghosting and/or regularization—are driven by the estimated noise content of each trace; noise can be estimated by analysis in specific time/offset data windows containing only noise: typically before the first break or after all expected arrivals FIG. 7 is a schematic block diagram of a programmable apparatus 4 according to the present invention. The apparatus comprises a programmable data process 5 with a program memory 6, for instance in the form of a read-only memory (ROM), storing a program for controlling the data processor 5 to perform any of the processing methods described above. The apparatus further comprises non-volatile read/write memory 7 for storing, for example, any data which must be retained in the absence of power supply. A "working" or scratch pad memory for the data processor is provided by a random access memory (RAM) 8. An input interface 9 is provided, for instance for receiving commands and data. An output interface 10 is provided, for instance for displaying information relating to the progress and result of the method. Data for processing may be supplied via the input interface 9, or may alternatively be retrieved from a machine-readable data store 11.

The programme for operating the system and for performing any of the methods, described hereinbefore is stored in the program memory 6, which may be embodied as a semi-conductor memory, for instance of the well-known ROM type. However, the program may be stored in any other suitable storage medium, such as magnetic data carrier 6a, such as a "floppy disk" or CD-ROM 6b.

While the principles of the disclosure have been described above in connection with specific apparatuses and methods, it should be clearly understood that this description is made only by way of example and not as limitation on the scope of the invention.

The invention claimed is:

1. A method of processing marine seismic data, the marine seismic data having been acquired in a seismic survey by N over streamers towed through a body of water at a first depth and by M under streamers towed through the body of water at a second depth greater than the first depth, where $0<M<N$, where a one of the M under streamers and one of the N over streamers comprise a vertically arranged pair of streamers and where the one of the M under streamers is disposed vertically below the one of the N over streamers the method comprising:

using a computer to read a computer readable non-transitory medium having a computer program stored thereon, wherein the computer program comprises computer readable instructions for:
a) processing seismic data from the one of the N over streamers and the one of the M under streamers in the vertically arranged pair of streamers using a 2D over/under processing routine to produce a combined over/under data set;
b) redatuming the combined over/under data set to the depth of the N over streamers;
c) processing the redatumed combined over/under data set with seismic data from a one of the N over streamers not in the vertically arranged pair of streamers to produce a 3D seismic data set.

2. A method as claimed in claim 1, wherein processing the seismic data from the one of the N over streamers and the one of the M under streamers in the vertically arranged pair of streamers using a 2D over/under processing routine to produce a combined over/under data set comprises combining the seismic data from the streamer in the vertically arranged pair of streamers to obtain first deghosted seismic data.

3. A method as claimed in claim 1, wherein the redatuming of the combined over/under data set to the depth of the N over streamers comprises using up/down wavefield separated data from the streamers in the vertically arranged pair of streamers to produce a redatumed data set.

4. A method as claimed in claim 1, wherein processing the redatumed combined over/under data set with seismic data from the one of the N over streamers not in the vertically arranged pair of streamers to produce the 3D seismic data set comprises applying a ghost response of the one of the N over streamers not in the vertically arranged pair of streamers to the redatumed combined over/under data set.

5. A method as claimed in claim 1, wherein (c) comprises combining low frequencies below a first frequency from the redatumed combined over/under data set with high frequencies above a second frequency from the seismic data from the one of the N over streamers not in the vertically arranged pair of streamers.

6. A method as claimed in claim 5, wherein the first frequency is equal to the second frequency.

7. A method as claimed in claim 1, wherein processing the redatumed combined over/under data set with seismic data from the one of the N over streamers not in the vertically arranged pair of streamers to produce a 3D seismic data set comprises taking account of the signal-to-noise ratio of the redatumed combined over/under data.

8. A method as claimed in claim 1, wherein the processing the redatumed combined over/under data set with seismic data from the one of the over streamers that is not in the in the vertically arranged pair of streamers to produce a 3D seismic data set comprises applying spectral balancing to the redatumed combined over/under data set.

9. A method as claimed in claim 8, wherein applying spectral balancing comprises applying an expected ghost response of the over streamers.

10. A method as claimed in claim 1, further comprising:
processing the 3D seismic data set to obtain information about one or more parameters of the earth.

11. A method as claimed in claim 1, further comprising:
disposing a streamer array in a water column such that the array comprises N over streamers disposed at a first depth and at M under streamers disposed at a second depth greater than the first depth, where $0<M<N$;
actuating a seismic source to emit energy: and
acquiring seismic data at receivers disposed on the streamers of the array.

12. An apparatus for processing seismic data, the data having been acquired by N over streamers disposed at a first depth and by M under streamers disposed at a second depth greater than the first depth, where $0<M<N$, the apparatus comprising:
a) a processor for processing seismic data for an over streamer target location and seismic data for an under streamer target location, wherein the processor uses a 2D over/under processing routine to produce a combined over/under data set from the seismic data from the over streamer target location and the seismic data from the under streamer target location;
b) a processor for processing seismic data for another over streamer target location; and
c) a combiner for combining a result of (a) and a result of (b), wherein combining the result of (a) and the result of (b) comprises redatuming the combined over/under data set to the depth of the over streamer target location and processing the redatumed combined over/under data set with the processed seismic data from the another over streamer target location to produce a 3D seismic data set.

* * * * *